June 19, 1928.

O. W. COWGILL 1,673,902

FEEDING MECHANISM FOR BOX MAKING MACHINES

Original Filed Jan. 19, 1923   9 Sheets-Sheet 1

Inventor
Orph W. Cowgill
By Cornwall, Bedell & Janis
Attys.

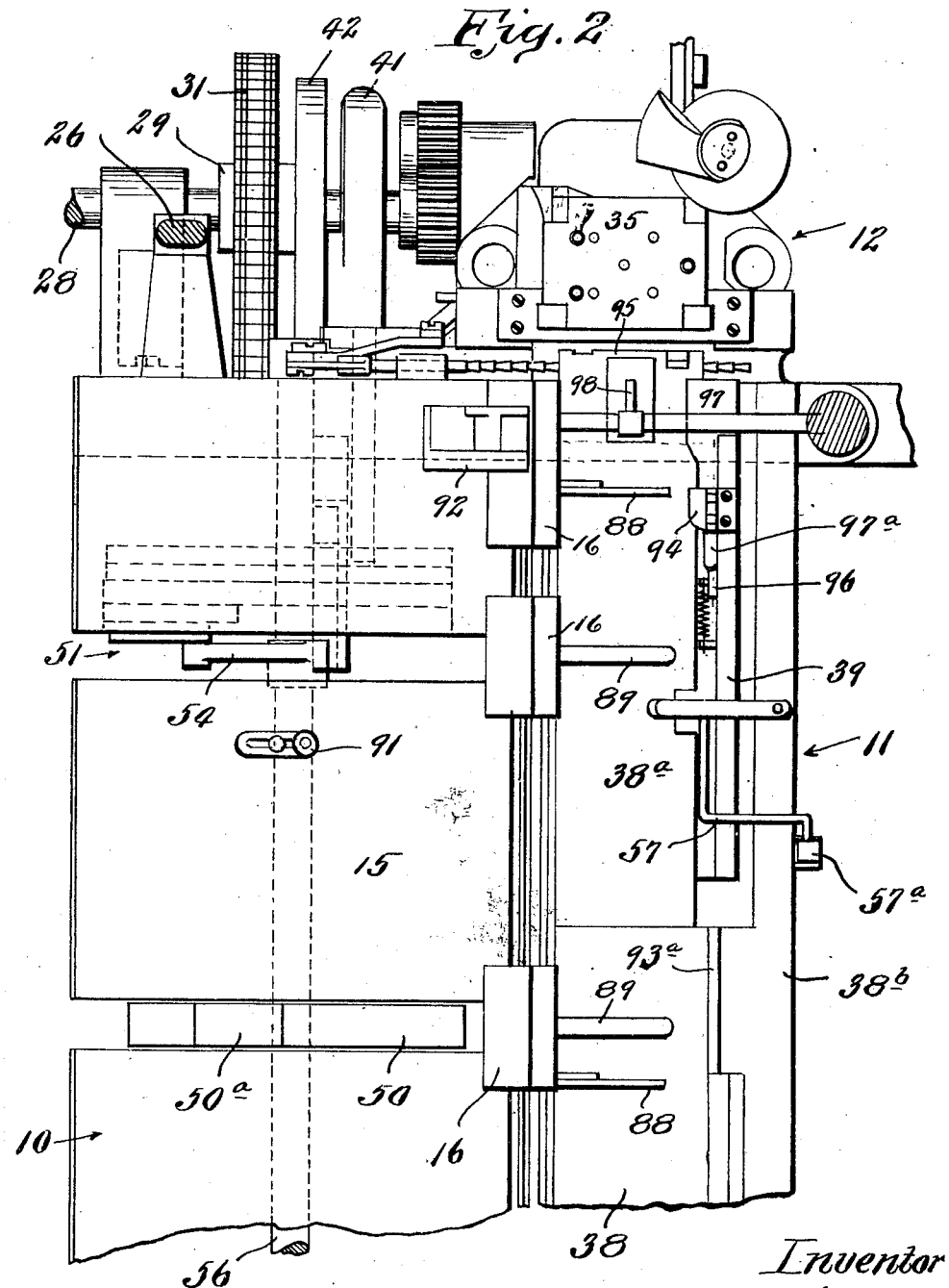

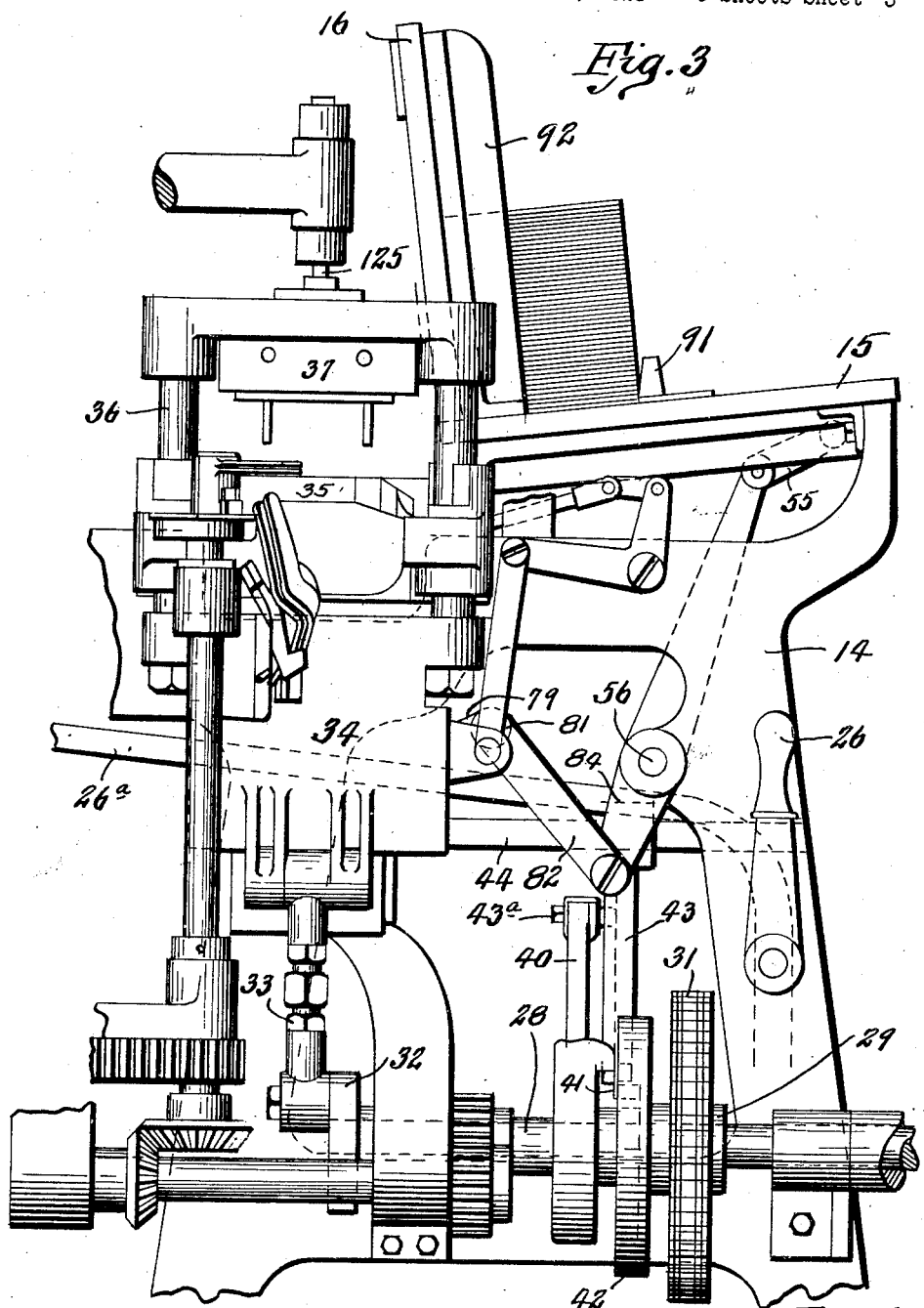

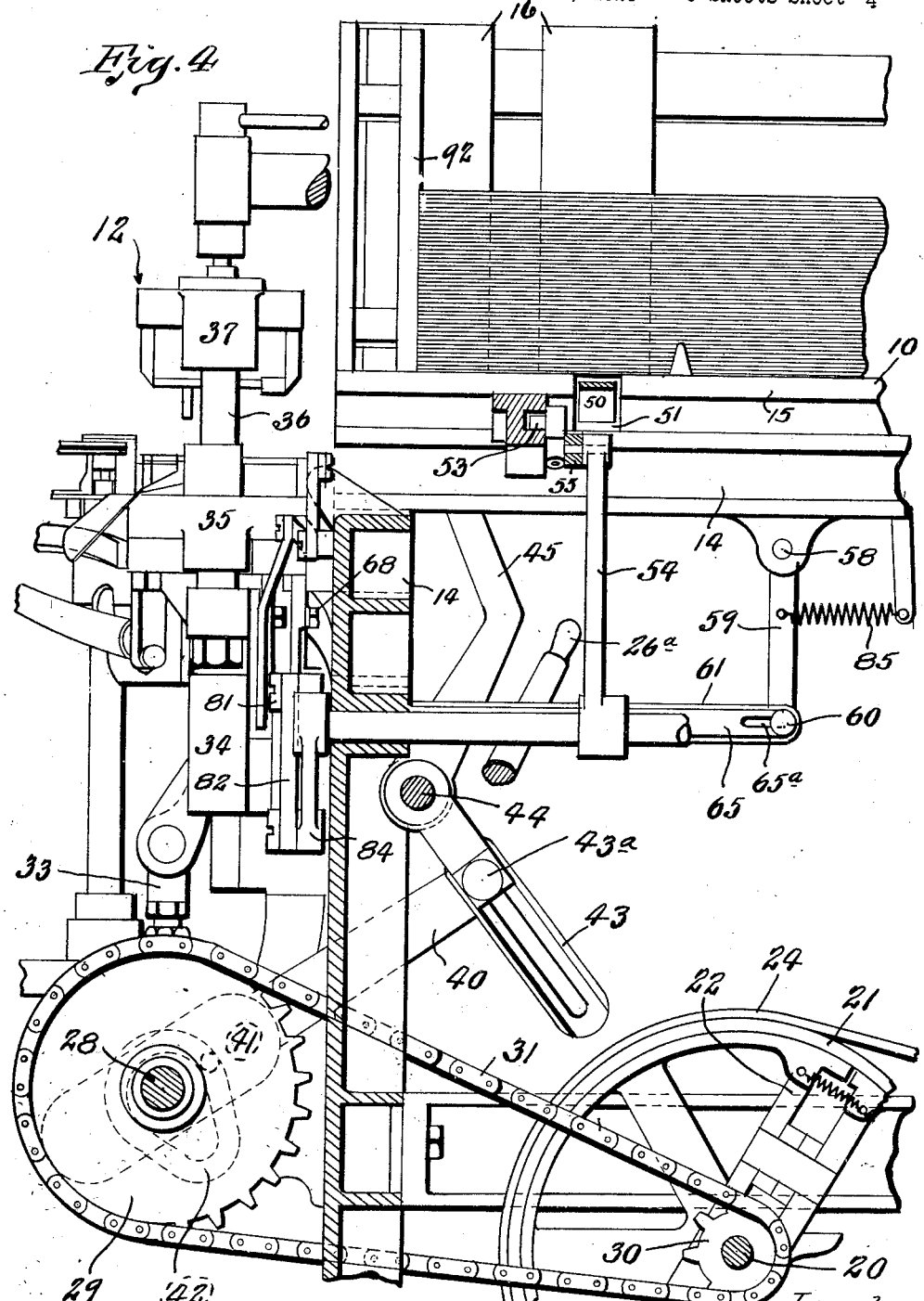

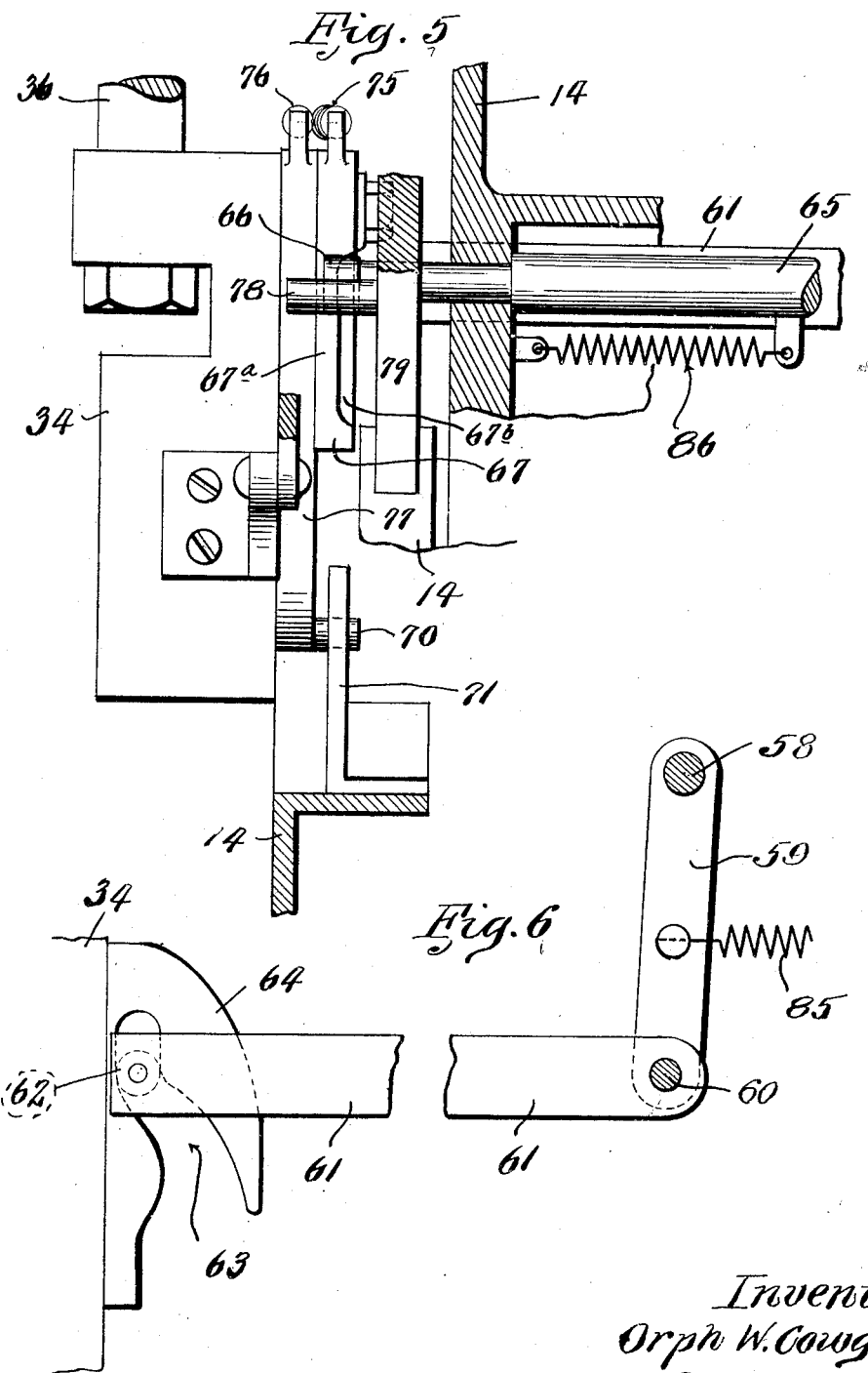

June 19, 1928.
O. W. COWGILL
1,673,902
FEEDING MECHANISM FOR BOX MAKING MACHINES
Original Filed Jan. 19, 1923    9 Sheets-Sheet 6
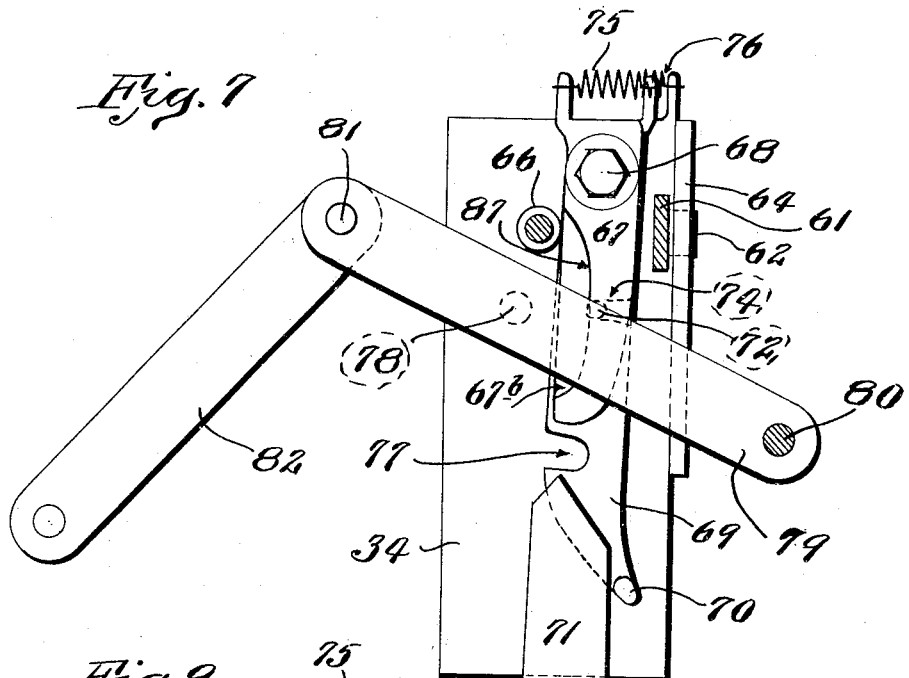
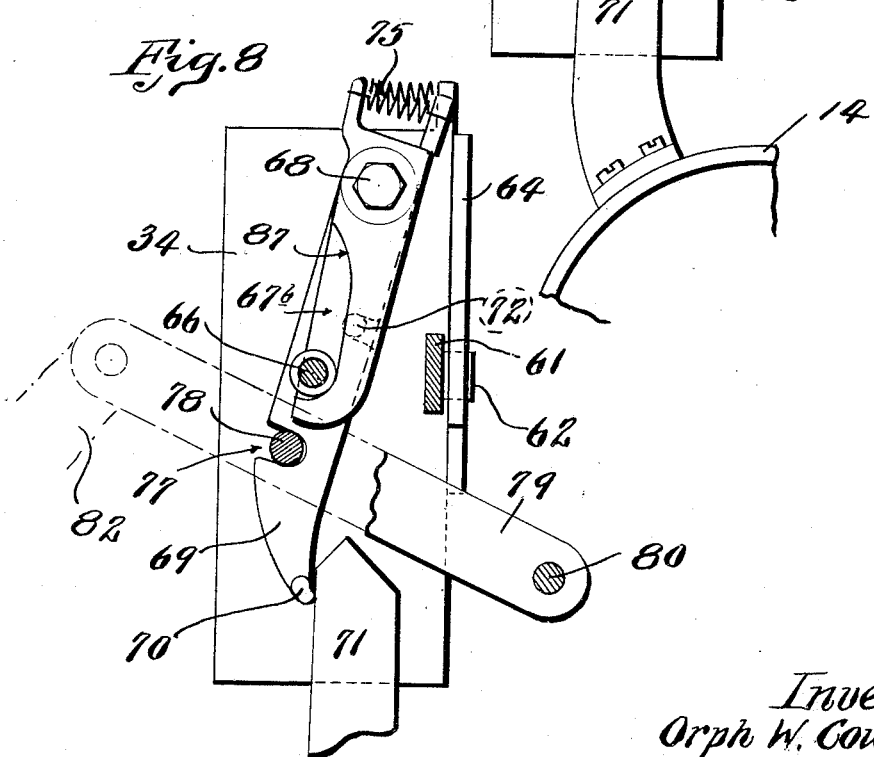
Inventor
Orph W. Cowgill
By Cornwall, Bidell & Janus
Atty's.

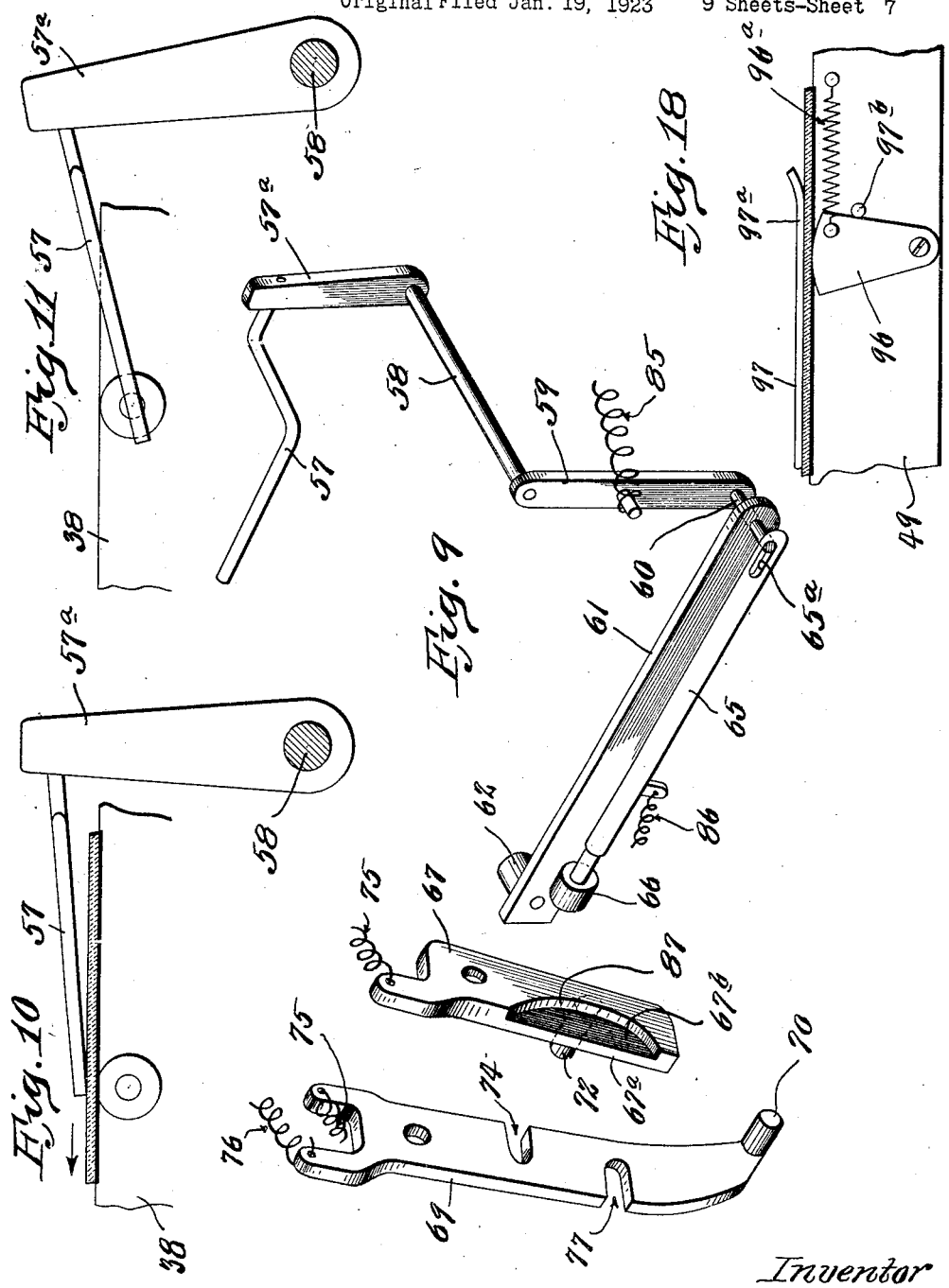

June 19, 1928.
O. W. COWGILL
1,673,902
FEEDING MECHANISM FOR BOX MAKING MACHINES
Original Filed Jan. 19, 1923   9 Sheets-Sheet 8
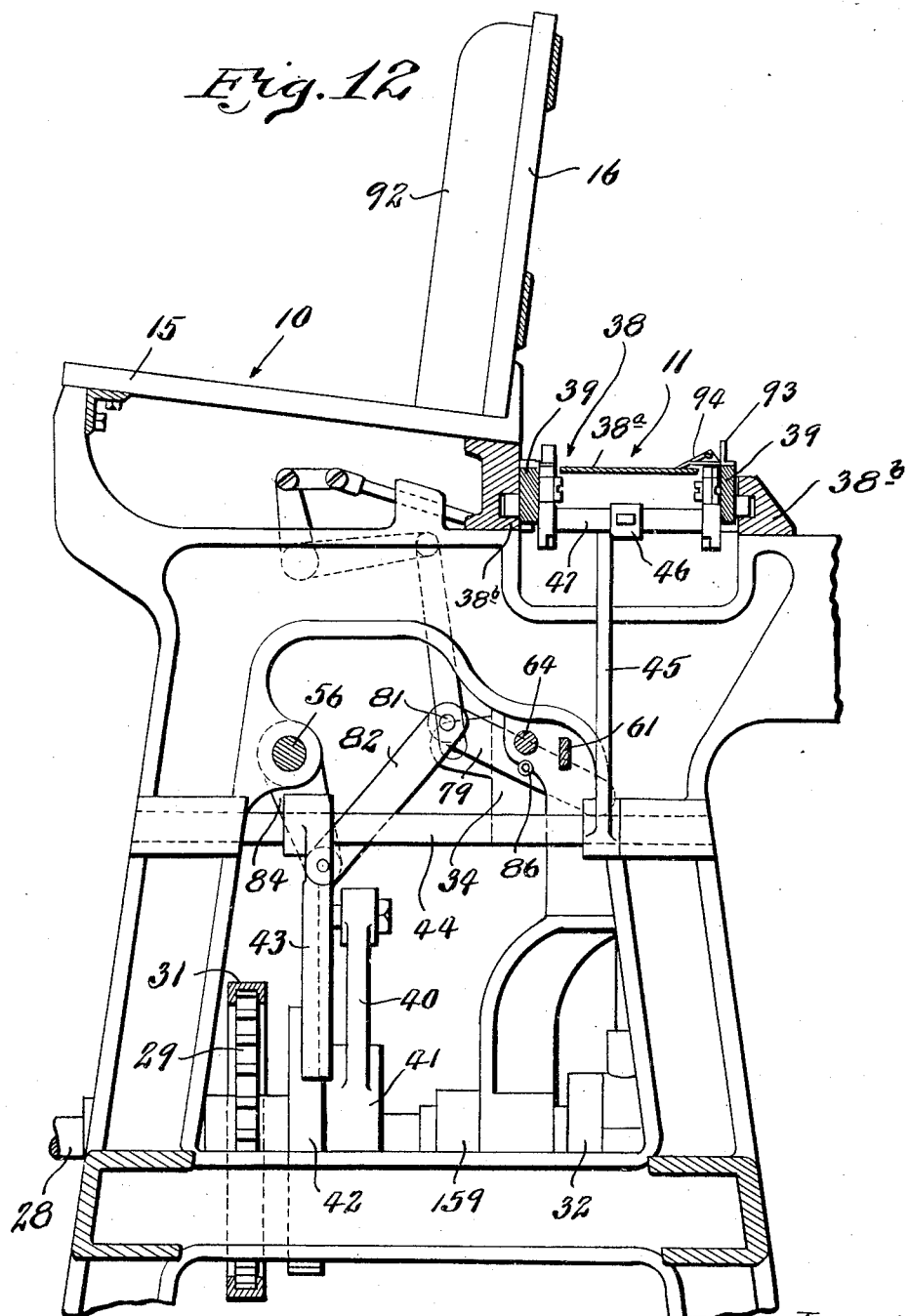

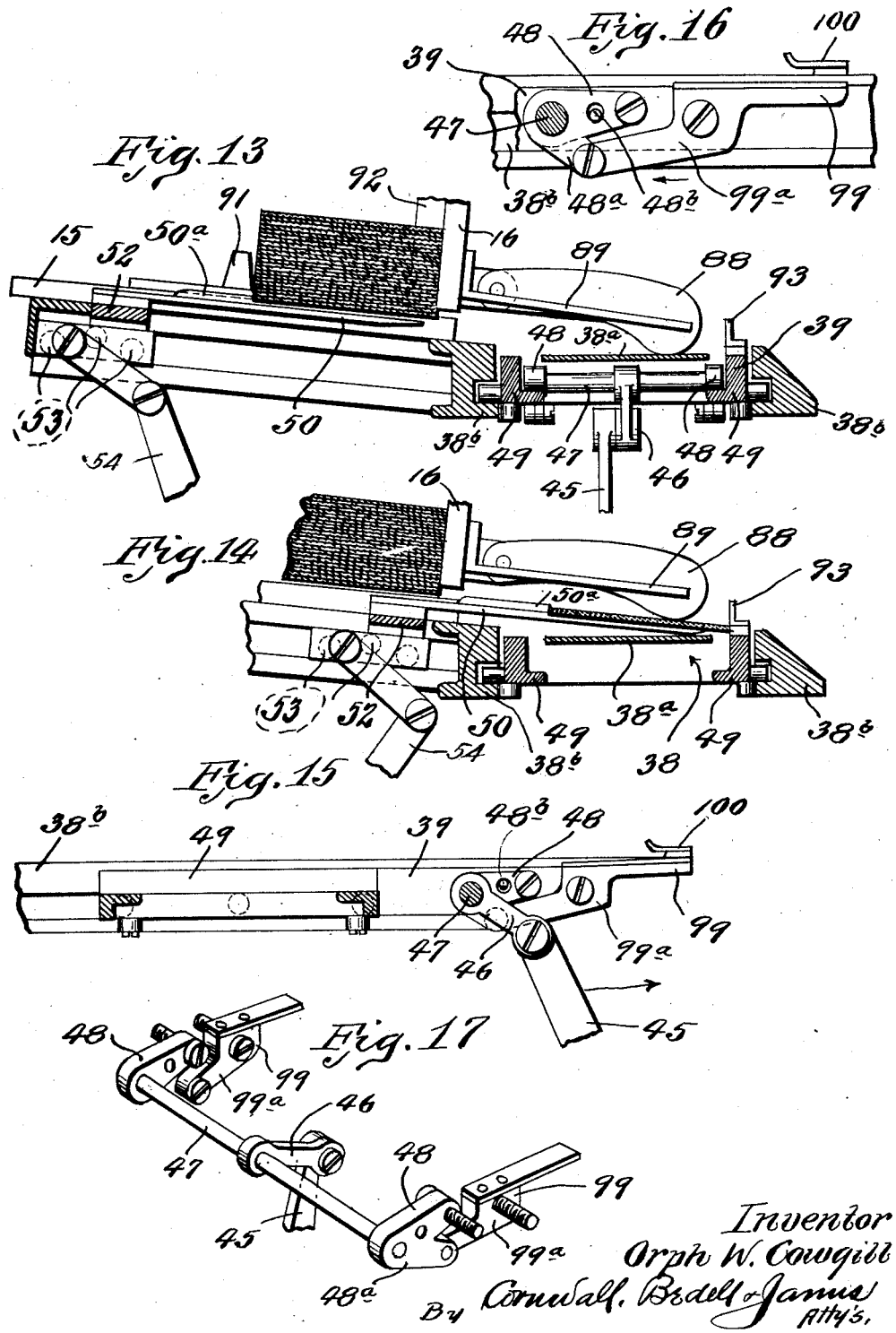

Patented June 19, 1928.

1,673,902

UNITED STATES PATENT OFFICE.

ORPH W. COWGILL, OF ST. LOUIS, MISSOURI, ASSIGNOR TO ST. LOUIS LABEL WORKS, OF ST. LOUIS, MISSOURI, A CORPORATION OF MISSOURI.

FEEDING MECHANISM FOR BOX-MAKING MACHINES.

Original application filed January 19, 1923, Serial No. 613,632. Divided and this application filed August 10, 1925. Serial No. 49,417.

This invention relates to new and useful improvements in box making machines and is a divisional application of an application on box making machine filed by me January 19, 1923, Serial No. 613,632, which has matured into Patent No. 1,551,189, Aug. 25, 1925.

The objects of the invention are to provide a mechanism which is adapted to receive a strip of material from which a box is to be made and to automatically feed said strip at proper intervals to a suitable machine or mechanism designed to operate on such a strip.

Further objects of the invention are to provide a device adapted to receive a stack of strips which are then fed singly at proper intervals onto a reciprocating member which feeds a strip so positioned intermittently to a blanking and scoring mechanism, or to other means, With these and other objects in view, my invention consists in certain novel features of construction and arrangement of parts hereinafter more fully described and claimed, and illustrated in the accompanying drawings, in which—

Figure 2 is a plan view of the forward portion of the machine.

Figure 3 is an end view, partly broken away, of the forward end of the machine.

Figure 4 is a fragmental cross section taken longitudinally through the forward end of the machine.

Figure 5 is a detail view showing the front elevation of the tripping mechanism used for controlling the strip positioning means.

Figure 6 is a detail view of the operating connections for raising the strip engaging finger of the tripping means.

Figure 7 is a rear view of the tripping mechanism showing said mechanism in inoperative or disabled position.

Figure 8 is a similar view showing the tripping mechanism in engagement with the strip-positioning means.

Figure 9 illustrates perspective detail views of the tripping mechanism.

Figure 10 is a detail view of the strip engaging finger.

Figure 11 is a detail view showing the finger moving into an operative position.

Figure 12 is a vertical cross section taken transversely through the strip supplying portion of the machine.

Figure 13 is a cross sectional view of the strip positioning means.

Figure 14 is a similar view showing a strip positioned on the carriage.

Figure 15 is a cross section taken longitudinally through the carriage.

Figure 16 is a detail view showing the strip gripping means of the carriage.

Figure 17 is a perspective detail view of the gripping means and its operating connections.

Figure 18 is a detail view of means utilized for feeding the strip of material forward to the blanking mechanism.

Figure 1:
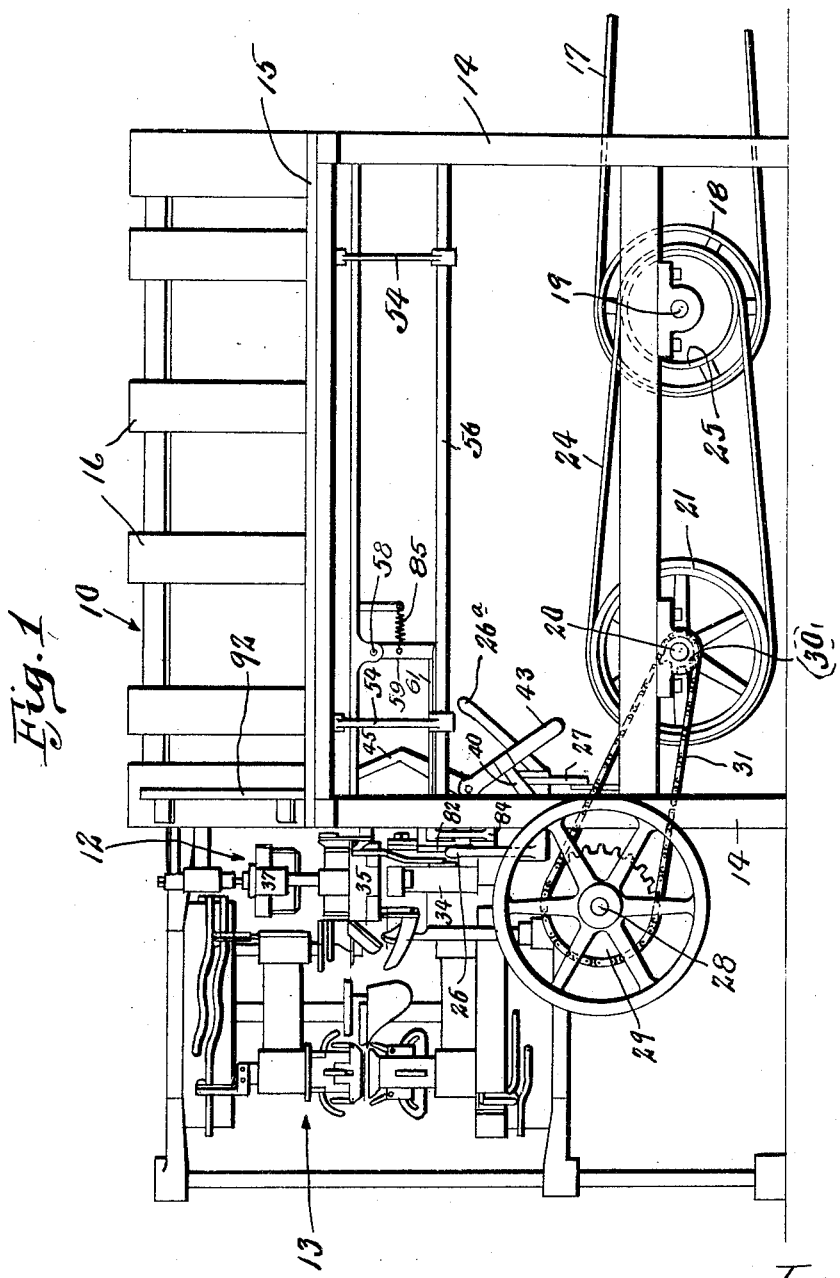
Figure 1 is a front elevation of the machine.

The invention contemplates a machine in which the strip of material is fed to a die which cuts out and scores a blank, which blank is then transferred to a folding mechanism wherein the blank is folded into the proper shape and a finishing or binding band is applied to the side walls of the box. Generally speaking, the machine consists of four sections, viz., the material supporting and feeding section 10; the strip positioning section 11; (Fig. 2) the blank cutting section 12; and the blank folding and band applying section 13.

The material supporting and feeding section 10 comprises frames 14, which support a table 15, the latter sloping rearwardly toward the blank or strip positioning section 11. Projecting upwardly from this table is a wall 16 preferably formed of upwardly extending slats which are spaced from each other and are supported on a suitable framework secured to frames 14.

The machine is actuated by an electric motor (not shown) through the medium of a belt 17 which passes over a pulley 18 fixed to shaft 19. This shaft is journaled in suitable bearings carried by the lower portion of frame 14. A shaft 20 is journaled in the forward end of frame 14 and carries a pulley 21 in which is arranged a clutch 22, whereby pulley 21 may be engaged or disengaged from shaft 20. A pulley 25 is fixed to shaft 19 and passing over this pulley and driving pulley 21 is a belt 24. Clutch 22 is controlled by a handle 26 arranged in the front end of the machine and a handle 26ª projecting rearwardly towards the blank feeding mechanism 11, thus enabling the operator to control the machine from either side. Suitable operating connections 27 connect said handles with clutch 22.

The shaft 28 is transversely journaled in bearings projecting outwardly from the forward end frame 14 and has fixed thereon a large sprocket wheel 29. Shaft 20 has fixed thereon a small sprocket wheel 30, and operating over these wheels and driving shaft 28 is a sprocket chain 31.

The rear or inner end of shaft 28 terminates below the blanking mechanism 12 and has fixed thereon a crank arm 32 to which is pivotally connected the lower end of an adjustable connecting rod 33, the upper end of which is pivotally mounted in the lower end of a casting 34. A stationary die member 35 is supported on the forward end of frame 14 above the casting 34 and projecting upwardly from this casting and passing through said stationary member 35 are posts 36, the upper ends of which carry a movable die member 37, which is designed to cooperate with the stationary member 35 and is operated from shaft 28 through the connections just described.

The strip or blank positioning section 11 consists of a shelf or frame 38 which extends outwardly and rearwardly from table 15, and on the same horizontal plane with the stationary member 35. This shelf consists of a horizontally disposed plate 38$^a$ supported by rails 38$^b$. Movably mounted in the forward end of this shelf or frame and supported by rails 38$^b$ is a reciprocating carriage 39. This carriage is operated from shaft 28 through the medium of an arm 40 loosely mounted on said shaft and having a roller 41 operating in the cam race of a cam 42, which is fixed to shaft 28. The upper end of arm 40 is adjustably secured to the slotted end of arm 43 by suitable fastening means 43$^a$ and imparts a rocking motion to a shaft 44. This shaft is journaled in suitable bearings projecting inwardly from the forward end frame 14, and has fixed thereon an upwardly extending arm 45, the upper end of which is pivotally connected to the free end of a link 46, which latter is carried by a rod 47. This rod is transversely arranged in the forward end of carriage 39 and has its ends fixed in arms 48, which latter are pivotally mounted on the inner sides of carriage frame 49. Frame 49 has laterally projecting rollers which operate in suitable raceways formed in the inner sides of rails 38$^b$ and downwardly presented rollers which hold the carriage in proper alignment. Shelf or frame 38 is designed to receive the strip of material and carriage 39 is arranged to feed it intermittently toward the blank cutting mechanism 12.

Where the material is supplied in the form of a series of strips, the strips are stacked on table 15 in parallel with shelf or frame 38, and suitable means is provided for moving the lowermost strip laterally from the stack onto the shelf.

The means for positioning the strips on the shelf consists of a series of bars 50 operating in slots 51 formed transversely in table 15 (Figs. 1, 2, 13 and 14). Each of these bars has a shoulder 50$^a$ formed thereon which extends upwardly beyond the upper surface of table 15 a sufficient distance to engage, during the rearward movement of said bars, the forward edge of the lowermost strip and push it from under the stack of the remaining strips onto the plate 38$^a$. The lower ends of the slats 16 terminate above table 15 a proper distance to provide clearance for the passage of single strips. Bars 50, which are secured at their outer ends to a longitudinally disposed iron 52, are supported by rollers 53 which ride in tracks formed in the sides of transverse members supported on frames 14 (Fig. 4). These bars are operated by means of arms 54 with which they are connected by links 55 and said arms are fixed to a shaft 56 longitudinally mounted in frame 14 and below table 15, which shaft is designed to be actuated when the strip located on shelf 38 reaches a predetermined position thereon in its forward movement toward the blanking mechanism. The strip positioning bars 50 and shaft 56 are set in operation by a finger 57 carried by an arm 57$^a$ which is fixed to a shaft 58, the latter being journaled below the shelf 38, and said finger projects upwardly above said shelf and is adapted to have its extreme end rest on the strip of material located on said shelf. The opposite end of shaft 58 extends toward table 15 and carries a depending arm 59. The lower end of this arm has a laterally projecting pin 60 to which is connected the rear end of a horizontally disposed bar 61, the forward end of which projects outwardly through the forward end frame 14 and has mounted thereon a roller 62. This roller is adapted to operate in an open ended slot 63 (Fig. 6) formed in a wing piece 64 which is fixed to and projects rearwardly from casting 34.

Arranged parallel with bar 61 is a rod 65 having a slotted rear end 65$^a$ engaging pin 60. The forward end of this rod carries a roller 66 which normally rides on the edge of a pivotal piece 67 (Figs. 5–9). This pivotal piece 67 is pivotally mounted on a bolt 68 which projects rearwardly from the rear wall of casting 34. Pivotally mounted on the same pin or bolt 68 adjacent to the rear wall of said casting is a rocking bar 69 which projects below the pivotal piece 67 and carries at its extreme lower end a laterally projecting pin 70. A plate 71 is stationarily mounted on the forward end of frame 14 below and rearwardly of casting 34 and projects upwardly into the path of pin 70. This plate is designed to engage, during the downward or operative movement of casting 34 and members 67 and 69. pin 70 and lock bar 69 in position. When bar 69 occupies a disengaged position, pin 70 rides on the rear edge of plate 71, as shown in Figure 7, and when bar 69 occupies an actuating position, said pin engages the forward end of plate 71, as shown in Figure 8.

Projecting laterally from piece 67 is a pin 72 which rests in a notch 74 formed in the edge of bar 69. Piece 67 and bar 69 are provided at their upper ends with oppositely disposed projections to which are secured the ends of a spring 75 which tends to draw said piece and bar together whereby pin 72 engages notch 74. Another spring 76 is connected at one end to the upper end of bar 69 and at its opposite end to casting 34 so that the interengaged members 67 and 69 are held under spring tension against roller 66 and as soon as this roller is retracted from its position, said members swing on pivot 68 into the strip positioning engagement.

The engagement is accomplished by means of a notch 77 formed in the forward edge of member 69, which notch, when members 67 and 69 swing forwardly, is moved into a position to engage a pin 78 projecting laterally from an arm 79. One end of this arm is pivotally secured to frame 14, as at 80, and its opposite or free end has a pivotal connection 81 with one end of a link 82. The opposite end of this link has a pivotal connection with the lower end of an arm 84 secured to and depending from shaft 56 (Fig. 3). Arm 79 and link 82 are angularly disposed relative to each other to form toggle mechanism and are under normal conditions inoperative, but when members 67 and 69 are displaced by the withdrawal of roller 66, slot 77 during the downward movement of said members and casting 34 engages pin 78 and actuates arm 79 and link 82, thereby causing arm 84 to rock so that shaft 56 and the strip positioning arms 54 and bars 50 are actuated.

Finger 57 is held downwardly against the strip of material on plate 38ª by means of a spring 85 which is anchored at one end to frame 14 and at its other end to arm 59. Roller 66 is held in its forward or disabled position by a spring 86 which is secured at one end to bar 65 and at its other end to frame 14. This spring, which is weaker than spring 85, maintains bar 65 in its extreme forward position so that pin 60 occupies the extreme rear end of slot 65ª, and when finger 57 moves downwardly and arm 59 rocks rearwardly, bar 61 and rod 65 are actuated. Slotted wing piece 64 carried by the movable casting 34 actuates through bar 61 finger 57 whereby the latter is lifted and moved away from plate 95 whenever a strip is being positioned on said plate by bars 50 so that the finger does not interfere with the placing of the strip on said shelf. This finger is also raised when the strip is being fed forward to the blanking machine, so that all danger of the strip being retarded by pressure exerted by said finger is removed. This operation of bar 61 does not affect bar 65 and roller 66 on account of the slot and pin interengagement of arm 59 and bar 65.

Roller 66 is not retracted past pivotal member 67 but only a sufficient distance to clear the edge 67ª, there being a portion removed from the rear side of said member to form a recess 67ᵇ which provides a sufficient clearance between said roller and said member when the latter occupies a displaced position. Recess 67ᵇ is formed with a cam face 87 upon which, during the downward movement of casting 34 and members 67 and 69, roller 66 rides, causing member 67 to be gradually swung rearwardly to its normal position. Upon reaching the upper end of cam 87 roller 66 and bar 65 are allowed to move forwardly under the influence of spring 86 to their normal positions. The forward movement of bar 65 is limited by a shoulder formed thereon and engaging frame 14. (Fig. 5.) The restoring movement of member 67 independently of member 69 is rendered possible by the slot-and-pin connection 72 and 74, respectively. Member 69 is restored by spring 75, the tension of which has been increased by the restoration of member 67 and this home movement of member 69 takes place as soon as pin 70 leaves the upper end of plate 71 and the notched portion 77 of member 69 is relieved of the pressure created by the operative engagement of pin 78 and portion 77. Normally, pressure produced in actuating arm 79 is sufficient to retain member 69 in engagement with pin 78 of arm 79, and the locking plate 71 is used to insure the operative connection and prevent accidental disengagement of arm 79 and member 69, as, for example, where the machine is stopped while the member 69 is still in engagement with pin 78 after member 67 has been restored. As there would be no pressure exerted upon member 69 by pin 78, said member would be restored by the tensioned spring 75 before the completion of the operation of the machine. By utilizing the locking plate 71, the danger of this is eliminated. When member 69 moves to its home position, notch 77 is moved out of engagement with pin 78 of arm 79 thereby disabling the strip positioning mechanism.

Pivotally mounted on and projecting outwardly and rearwardly from slats 16 are a series of pendants 88 which are designed to rest on and hold the strip of material to the plate 38ª. A series of plates 89 are secured to and project rearwardly from slats 16 and bear on top of each strip and prevent it from being moved out of engagement with shoulders 50ª after said strip has been moved from the stack of strips, thus insuring the strips being carried against stops 93 and 93ª. Upwardly presented cone-shaped pins 91 are adjustably arranged on table 15 for maintaining in proper position the strips placed on the table. The first one of slats 16, which is located above the forward frame 14, has a guide 92 adjustably secured thereto and projecting forwardly therefrom, and forming a stop for the forward ends of the strips so that said strips, when they are stacked on the table 15, can be properly aligned with respect to carriage 39.

The rear side frame of carriage 39 is provided with an upwardly projecting portion 93 which forms a stop and limits the lateral movement of the strip when it is being placed on plate 38ª. After bars 50 have deposited a strip on said plate, they are retracted in readiness for another operation, the forward ends of shoulders 50ª being rounded or tapered to enable the bars to pass under the stacked strips to their normal positions without disturbing said strips.

When a strip is placed in position on plate 38ª and carriage 39, its forward end rests on a plate 94 which is hinged to one of the side frames of carriage 39 adjacent to stop 93 and presses against the extension plate 95 on shelf or frame 38. Immediately below strips 93 and hinged plate 94 is pivotally mounted a strip locking piece 96, the upper end of which is eccentric so as to engage the strip and feed it forward during the forward movement of the carriage and adapted to ride free of the underside of said strip when the carriage is moved rearwardly to its normal position. When carriage 39 is moved forward to feed the previously positioned strip to the blanking mechanism, the forward end of the new strip which is stationary, as it is not yet engaged by the carriage, drops onto plate 38ª, or on top of the rear end of the old strip, and on the return or rearward movement of the carriage, hinged plate 94 rides over the forward end of the new strip, so that the latter can be engaged by the locking plate 96. A stationary plate 97 is fixed to one of the side frames of the carriage 39 forwardly of hinged plate 94 and has a rearward extension 97ª which overlies the eccentric end of piece 96 and forms a rigid support between which and the free end of piece 96 the strip is gripped (Figs. 12 and 18). This pivotal piece 96 is moved into this strip-engaging position by a spring 96ª while the stop 97ᵇ prevents the excessive movement in the opposite direction. Thus, the strip is fed forward to the blanking mechanism 12 during the forward movement of the carriage 39 by the locking piece 96 and during the retrograde or rearward movement of the carriage the strip is held stationary by a spring pressed presser foot 98 (Fig. 2) pivotally mounted above the forward end of the extension plate 95 and arranged so as to allow the forward movement of the strip and hold said strip stationary against the fixed extension plate 95 while the carriage is being restored to its normal position.

In order to accurately hold the strip while it is being fed forwardly and particularly the short last portion thereof, the extreme forward end of the carriage is provided with strip gripping elements 99 pivotally mounted on the forward ends of the side frames of the carriage. One of said gripping elements cooperates with and bears against the underside of the forward end of plate 97 and the other element cooperates with the underside of a plate 100 which is mounted on the corresponding forward end of the carriage frame 39. These gripping elements normally occupy disengaged positions, as shown in Figure 16, and when the carriage is moved forwardly said elements are automatically rocked on their pivots so that their forward ends are brought against their corresponding cooperating plates, as shown in Figure 15.

The movement of the elements 99 into the strip gripping positions is effected by forming on each element rearward extensions 99ª, which are pivotally connected to a forwardly presented lug 48ª on the corresponding arm 48, and the movement of the elements 99 to engage the strip is accomplished immediately before carriage 39 starts on its forward movement, and said elements are moved into a disengaging position immediately before the carriage begins its rearward movement. Arms 48, through which carriage 39 is actuated by arm 45, are pivotally mounted on the side frames of the carriage and have a slight rocking movement relative thereto so that when arm 45 is actuated, said arms are rocked before carriage 39 is actuated. This slight rocking movement of arms 48 is designed to operate elements 99 causing them to move into engaging or disengaging position, as the case may be, before carriage 39 starts on its travel. The rocking movement of arms 48 is limited by pins 48ᵇ which are carried by and project inwardly from the side frames of the carriage and engage apertures formed in arms 48.

In the operation of the machine, the material from which the boxes are made is supplied to plate 38ª either in the shape of strips, which are stacked on the table 15 and singly positioned on said plate 38ª, or in the form of a roll suitably supported and fed onto said plate. This material is then intermittently fed forward to the blanking and scoring mechanism 12 by the reciprocating carriage 39.

The operation of the feeding mechanism is entirely automatic, a strip being moved from under a stack onto a reciprocating carriage at the required movement and said carriage then feeds the strip intermittently to the cutting or blanking means. The actuation of the strip positioned means is controlled by the travel of the preceding strip so that a new strip is brought forward only when the preceding strip reaches a predetermined position.

I claim:

1. A feeding mechanism for box making machines comprising a shelf adapted to receive a strip of material, a traveling carriage movably mounted on said shelf for feeding said strip forward, means for supplying strips of material to said shelf, a displaceable member for actuating said supplying means and means controlled by the position of the strip on said shelf for moving said displaceable member into operative or inoperative position.

2. A feeding mechanism for box machines comprising a stationary shelf adapted to receive a strip of material, a traveling carriage movably mounted on said shelf and adapted to feed said strip forward, means for positioning strips of material on said shelf, operative connections for said positioning means, and means for normally disabling said operative connection, said means being displaceable when the strip on said shelf reaches a definite position whereby said operative connection is actuated and operates said strip positioning means.

3. A feeding mechanism for box machines comprising a shelf adapted to receive a strip of material, a traveling carriage mounted in said shelf and movable longitudinally thereof and adapted to feed said strip forward, means movable transversely of said shelf for positioning a strip of material on said shelf, an arm operable to actuate said strip positioning means, a member movable in a vertical plane adjacent to said arm, said member being pivotally mounted for movement into and out of engagement with said arm for actuating the latter and means including a finger engageable by said strip for automatically moving said pivotal member into operative or inoperative relation with said arm.

4. A feeding mechanism for box making machines comprising a table for supporting strips of material, a shelf arranged adjacent to one side of said table, means movably mounted on said table for successively discharging said strips onto said shelf, a traveling carriage for engaging the strip on said shelf and feeding it forward, displaceable means for actuating said strip discharging means, and means for normally holding said displaceable means inoperative and operable when the strip on the shelf reaches a predetermined position to bring said displaceable means into actuating engagement with said strip discharging means.

5. A feeding mechanism of the class described comprising a support, a reciprocatory carriage in said support, means on said carriage for engaging a strip of material and feeding it in one direction, a presser foot for holding said strip immovable during the retracting movement of said carriage, a rock arm for actuating said carriage and connections between said arm and said carriage and including means movable against a rigid part of said carriage for gripping said strip therebetween during the forward movement of said carriage and releasable with the return movement.

6. A feeding mechanism for box making machines comprising a support, a reciprocatory carriage mounted in said support, a presser foot for holding said strip of material against movement during the return stroke of said carriage, a pair of grippers pivotally mounted near the forward end of said carriage and adapted to cooperate with overhanging portions thereof to grip a strip of material and move it forward with the carriage, a pair of links mounted in said carriage and operatively connected to said grippers, and actuating mechanism for said carriage and connected to said links for actuating therethrough said grippers, said links having a limited lost motion relation to said carriage to permit actuation of said grippers preparatory to movement of said carriage.

7. A feeding mechanism of the class described comprising a support, a reciprocatory carriage mounted in said support, a retaining member yieldingly carried by said carriage and adapted to lock a strip of material to said carriage during the travel thereof in one direction, a presser foot for holding the strip against movement during the return stroke of said carriage, mechanism for actuating said carriage, means for positioning a strip of material on said carriage, and a movable member on said carriage for separating the overlapping ends of the strips during the positioning of the new strip on said carriage.

8. A feeding mechanism of the class described comprising a table for supporting a stack of strips of material, a shelf arranged to one side of said table below the horizontal plane thereof and adapted to receive one strip at a time, strip positioning means mounted underneath and movable transversely of said table for moving the lowermost strip transversely of said stack onto said shelf, and mechanism for actuating said strip positioning means in predetermined relation with the position of the strip on said shelf.

9. A feeding mechanism of the class described comprising a table for supporting a stack of strips of material, a shelf arranged to one side of said table below the horizontal plane thereof and adapted to receive one strip at a time, strip positioning means mounted below said table and movable transversely thereof for moving the lowermost strip of said stack onto said shelf, actuating means for said strip positioning mechanism and mechanism controlled by the strip on said carriage for moving said actuating means into operative or inoperative relation with said strip positioning means.

10. A feeding mechanism of the class described comprising a table for supporting a stack of strips of material, a shelf arranged to one side of said table and adapted to receive one strip at a time, strip positioning means disposed underneath said table and movable transversely of said table and said shelf for moving the lowermost strip of said stack onto said shelf, mechanism for actuating said strip positioning means, a member operable in a vertical plane, a vertically disposed arm pivotally mounted on said member and movable into and out of operative engagement with said actuating mechanism, connections for positioning said arm relative to said mechanism, a finger adapted to be engaged by a strip on said carriage and associated with said connections for maintaining said arm in inoperative position and adapted when freed by said strip to render said arm operative with respect to said actuating mechanism and cause a new strip to be positioned on said shelf.

11. In a feeding mechanism for box making machines, the combination with a strip feeding means, of a mechanism operable transversely relative thereto for positioning a new strip onto said feeding means, actuating member therefor, said member being displaceable into inoperative position, operative connections for controlling said displaceable member and effecting the operative interengagement between said actuating member and said positioning mechanism, and a member engageable by the strip positioned on said feeding means for actuating said operating connection and disabling said actuating member.

12. In a feeding mechanism of the class described the combination of a stationary support comprising a table for receiving a stack of strips of material and a shelf disposed to one side and below the horizontal plane thereof, of a series of strip engaging bars movable transversely through slots in said table for displacing the lowermost of said strips and positioning it on said shelf, actuating means for said bars, a movable member adapted to engage and operate said actuating member, said member being displaceable to render said actuating means inoperative, and a member cooperating with the strip positioned on said shelf for positioning said displaceable member and rendering said actuating means operative or inoperative.

13. In a feeding mechanism of the class described, the combination with a strip positioning mechanism, of a rock shaft for actuating the same, and toggle mechanism for operating said rock shaft, and a device having a definite line of movement and displaceable to engage said toggle mechanism and set in operation said strip positioning mechanism.

14. In a feeding mechanism of the class described, the combination with a strip positioning mechanism, of a rock shaft for actuating the same, toggle mechanism for operating said rock shaft, a device having a definite line of movement and displaceable to engage said toggle mechanism and set in operation said strip positioning mechanism, and a member disposed in the path of movement of said device for insuring the completion of the operative stroke thereof in predetermined relation with said toggle mechanism.

15. In a feeding mechanism of the class described, the combination with a strip positioning means, of a toggle mechanism for operating the same, a device having a definite line of movement and adapted to engage and operate said toggle mechanism, and a member engaging said device and operable to bring said device into or out of engagement with said toggle mechanism.

16. A feeding mechanism of the class described comprising a table for supporting a stack of strips of material, a shelf arranged to one side of said table and adapted to receive one strip at a time, strip positioning means movable transversely of said table and said shelf for moving the lowermost strip of said stack onto said shelf, mechanism for actuating said strip positioning means, a finger adapted to be engaged by a strip on said carriage for maintaining said actuating mechanism inoperative and adapted when released by the movement of said strip to render said actuating mechanism operative to cause a new strip to be positioned on said shelf, and means operable in correlation with said strip positioning means for moving said finger out of the path of movement of the strip being positioned on said carriage.

17. In a feeding mechanism of the class described, the combination with a strip feeding mechanism, of means for positioning a new strip of material onto said feeding mechanism, actuating means for said strip positioning means, and a finger adapted to bear against the strip positioned on said feeding mechanism, said finger controlling said actuating mechanism whereby said strip positioning mechanism is rendered inoperative so long as said finger bears against said strip and is rendered operative when said finger is released by said strip.

18. A feeding mechanism for box making machines comprising a stationary support adapted to receive a strip of material, a carriage movably mounted in said support and adapted to engage said strip and feed it forward, a member mounted in said support and yieldingly bearing on said strip for permitting forward movement thereof and hold said strip against retrograde movement, a rock shaft, a rock arm on said shaft for actuating said carriage, a longitudinally movable bar for actuating said shaft, a roller fixed transversely to one end of said bar, a vertically movable cam for engaging said roller and imparting longitudinal movement to said bar, and means for operating said cam.

19. A feeding mechanism for box making machines comprising a support for receiving a stack of strips of material, a frame for receiving single strips of material, mechanism for depositing single strips of material from said support onto said frame, a strip feed member operatively arranged on said frame for feeding the strip positioned thereon in one direction, and an element engageable by the strip on said frame for enabling and disabling said depositing mechanism.

20. In a feeding mechanism, a strip depositing mechanism, an actuating member adapted to operatively engage said mechanism, means for normally holding said actuating member disengaged, and an element for displacing said means to permit said member to assume operative position when the deposited strip reaches a predetermined position.

21. In a feeding mechanism, the combination with a strip depositing mechanism, of a pair of pivotal arms having a fixed line of travel, one of said arms being movable into actuating engagement with depositing mechanism, a displaceable member adapted to engage the other arm for maintaining both of said arms in retracted or disengaged position, and an element engageable by a strip of material controlling said displaceable member.

22. In a feeding mechanism, the combination with a strip depositing mechanism, of a pair of pivotal arms, one of which is movable into actuating engagement with said depositing mechanism, the other arm being movable to one position simultaneously with the first arm and in the normal position in advance thereof, and a coiled spring connecting said arms and adapted to be placed under increased tension when said arms are displaced relative to each other, thereby insuring the return movement of said actuating arm.

In testimony whereof I hereunto affix my signature this 6th day of August, 1925.

ORPH W. COWGILL.